United States Patent [19]

Haupt

[11] Patent Number: 4,599,622

[45] Date of Patent: Jul. 8, 1986

[54] PHASE ONLY ADAPTIVE NULLING IN A MONOPULSE ANTENNA

[75] Inventor: Randy L. Haupt, Stow, Mass.

[73] Assignee: The United States of America as represented by the Secretary of the Air Force, Washington, D.C.

[21] Appl. No.: 629,926

[22] Filed: Jul. 11, 1984

[51] Int. Cl.$^4$ ............................. G01S 5/02; G01S 3/16
[52] U.S. Cl. ..................................... 343/427; 343/379
[58] Field of Search ........................... 343/427, 377–384

[56] References Cited

U.S. PATENT DOCUMENTS

| | | | |
|---|---|---|---|
| 3,268,890 | 8/1966 | Birge | 343/5 |
| 3,720,941 | 3/1973 | Ares | 343/7 A |
| 4,045,800 | 8/1977 | Tang et al. | 343/854 |
| 4,079,380 | 3/1978 | Esry et al. | 343/100 SA |
| 4,079,381 | 3/1978 | Piesinger | 343/100 SA |
| 4,214,244 | 7/1980 | McKay et al. | 343/18 E |
| 4,225,870 | 9/1980 | Marner et al. | 343/854 |
| 4,228,436 | 10/1980 | Dufort | 343/854 |
| 4,298,873 | 11/1981 | Roberts | 343/100 SA |

Primary Examiner—Theodore M. Blum
Assistant Examiner—Gregory C. Issing
Attorney, Agent, or Firm—Donald J. Singer; Richard J. Donahue

[57] ABSTRACT

A monopulse radar having a single set of phase shifters shared by both sum and difference channels. The radar utilizes an algorithm that effects simultaneous nulling in the sum and difference patterns of its phased array antenna. An algorithm is developed for phase-only nulling which does not require knowledge of the location of interference sources.

1 Claim, 7 Drawing Figures

PHASE ONLY ADAPTIVE NULLING IN A MONOPULSE ANTENNA

STATEMENT OF GOVERNMENT INTEREST

The invention described herein may be manufactured and used by or for the Government for governmental purposes without the payment of any royalty thereon.

BACKGROUND OF THE INVENTION

This invention relates to monopulse radars, and in particular to means for effecting simultaneous nulling in the sum and difference patterns of a monopulse phased array antenna using one set of phase shifters shared by both channels.

In the past few years, considerable research and development has been expended on adaptive antennas. Communications and sonar systems have reaped some of the benefits of adaptive technology while radars generally have lagged behind. Some of the reasons for this dichotomy are that many adaptive techniques are not suited for microwave frequencies; radars have large antennas, hence more adaptive loops; and a radar has tight time constraints for detecting and tracking targets. Consequently, only a handful of radars incorporating sidelobe cancelling techniques exist today.

Monopulse radars add additional problems to the adaptive processing. Monopulse tracking radars use a multiple beam antenna to determine the position of a target. The sum far-field antenna pattern has its peak in the direction of the target, while a difference pattern has its null on the target. By taking the ratio of the difference channel output to the sum channel output, enough information is obtained to track the target accurately. Assuming the target is on boresite, the sum channel has a strong output signal and the difference channel has very little output since the target is in the null. The resulting monopulse ratio is zero. When the target moves, it moves out of the difference pattern null into either the positive lobe or a negative lobe of the difference pattern. In turn, the monopulse ratio changes to a small positive or negative value. The target angular position information is then deducted from the monopulse ratio.

Interference from the environment or other electromagnetic systems can seriously degrade the tracking performance of a monopulse radar. An interference in the sum channel will destroy range and resolution information as well as tracking data. The undesired signals enter the sidelobes of both the sum and difference far-field patterns and add with the desired signal in the main beam direction. If the interference is strong enough, the desired signal will not be detected. As a result, the radar's detection range is decreased to a point where the return signal from a target can be detected. Consider a simple form of the radar range equation given by:

$$R_{max} = \left\{ \frac{P_t G A_e \sigma}{(4\pi)^2 S_{min}} \right\}^{\frac{1}{4}}$$

where
$R_{max}$ = maximum radar range
$P_t$ = transmitted power
$G$ = transmitting antenna gain
$A_e$ = receiving antenna effective aperture (area)
$\sigma$ = target radar cross section
$S_{min}$ = minimum detectable signal (power)

In the presence of interference, $S_{min}$ will increase because the desired signal must now be greater than the interference signal, rather than just the receiver noise (assuming the interference signal > receiver noise). Thus, the interfering signal poses a serious threat to radar systems by limiting the maximum range of the radar.

Interference reduction techniques are necessary to improve antenna performance in a heavy signal environment. Of particular interest are fully adaptive phased array antennas. An adaptive antenna has the ability to place nulls in its far-field radiation pattern in the direction of interference sources. The depths and bandwidths of the nulls determine how well interference sources are suppressed. These nulls are placed in the far-field pattern by adaptively adjusting the phases of the signals at the elements in a phased array.

Putting a null in the sum far-field pattern (in the direction of interference) will not necessarily result in a similar null in the far-field difference pattern. Consequently, the detection capability will improve, but tracking capability, in general, will not. In most situations, it would be desirable to improve the radar's detection and tracking performance at the same time. This can be done by simultaneous adaptive nulling in the sum and difference channels. Either the sum and difference channels must be adapted separately, or a technique of simultaneously nulling in both channels must be used.

In a copending application by the present inventor entitled "Simultaneous Nulling In The Sum The Difference Patterns of a Monopulse Antenna", having Ser. No. 498,334, and filed May 26, 1983, there is disclosed apparatus and a technique for simultaneously placing nulls in the sum and difference patterns of a monopulse phased array antenna. A preferred embodiment of this earlier invention includes circuitry for not only shifting the phase of the signals, but includes means for also adjusting the amplitude of the signals.

A significant shortcoming of this prior invention however, is that the location of the jammer sources must be known. A further limitation is that the phase only implementation thereof is limited to use in very low sidelobe antennas. Also the depths of the nulls achieved by this prior invention are limited.

OBJECTS AND SUMMARY OF THE INVENTION

It is therefore a principal object of the invention to provide a new and improved means for effecting simultaneous nulling in the sum and difference pattern of a monopulse radar antenna.

It is another object of the invention to provide improved simultaneous nulling in the sum and difference patterns of a monopulse radar antenna using a technique that allows nulling with one set of phase shifters shared by the two monopulse channels.

It is another object of the invention to provide improved means for effecting simultaneous nulling in the sum and difference patterns of a monopulse radar antenna that is implemented by means of a phase only algorithm.

It is another object of the present invention for effecting simultaneous nulling in the sum and difference patterns of a monopulse radar antenna without requiring specific knowledge of the jammer source locations.

It is another object of the present invention to provide means for effecting simultaneous deep nulling in monopulse antennas having any levels of sidelobe responses.

The invention comprehends a monopulse radar having a null pattern generating capability that can be implemented with a single set of phase shifters that are used by both sum and difference channels. It comprises an apparatus and technique for simultaneously placing nulls in the sum and difference patterns of the monopulse phased array antenna and includes a phased array antenna having N equally spaced elements, a computer, and feedback circuitry. Connected to each element of the phased array antenna is a phase shifter which steers the main beam as well as generates the nulls in the far field pattern. After the phase shifter the signal is split into a sum and difference channel. The computer uses a special algorithm to adaptively adjust the phase shifters to place a null simultaneously in the sum and difference patterns.

These and other advantages, objects and features of the invention will become more readily apparent from the following detailed description when taken in conjunction with the illustrative embodiment in the accompanying drawings.

DESCRIPTION OF THE PREFERRED EMBODIMENT

Figure 1:
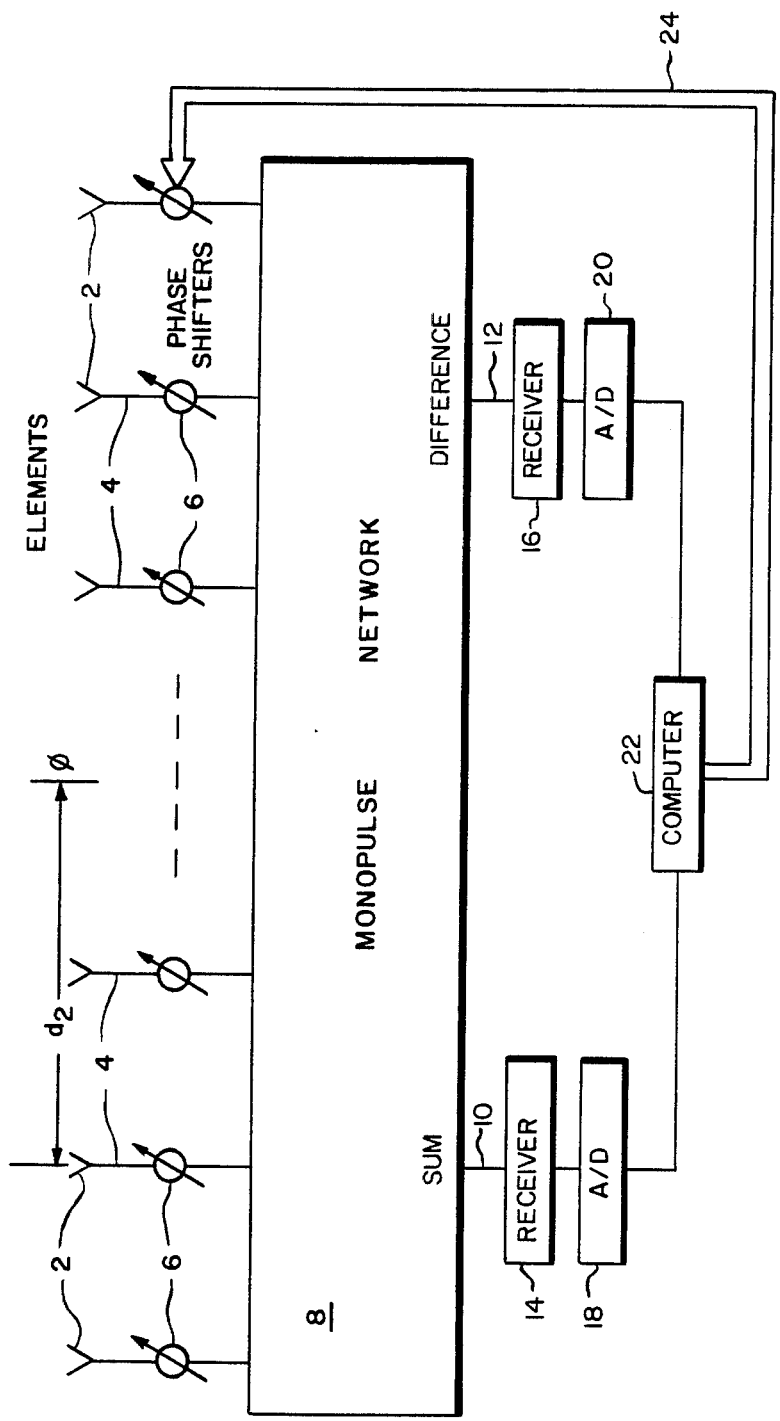
FIG. 1 is a diagrammatic illustration of a monopulse antenna system constructed in accordance with the present invention.

Referring now to the drawings, FIG. 1 is a diagrammatic representation of the preferred configuration of the present invention. Although the invention is described for a phased array antenna, it may also be implemented on a reflector type or space fed lens antenna that has a phased array feed.

The array elements 2 receive signals from the desired source as well as any jammer signals. The signals pass through transmission lines 4 to phase shifters 6 which induce a predictable phase change to the received signals. Next the signals enter the monopulse network 8 where they are added together to form the sum channel output 10. The difference channel output 12 is formed by giving half of the signals a 180 degree phase shift and adding them to the signals from the other half of the array.

From the monopulse network, the output signals pass on to their respective receivers 14 and 16 where they are detected. They are then digitized by A/D converters 18 and 20, and sent to a computer 22. The computer steers the main beam, detects and tracks the target, and performs the adaptive nulling disclosed herein. The phase shifters are controlled by the computer through control lines 24.

The type of algorithm used to provide the adaptive nulling depends upon the antenna architecture and the interference environment. An antenna with receivers at every element can use an adaptive algorithm such as the sample matrix inversion or Howells-Applebaum adaptive loops, whereas an antenna with a single receiver at the sum port must use a random, gradient search, or other similar algorithm. Some of the other algorithm dependent factors may be bandwidth, antenna size, sub-array arrangement, beam forming architecture, types of interference, number of interfering signals, and number of simultaneous beams. The antenna under consideration here has neither amplitude controls nor receivers at each element. Thus, the algorithm can use phase-only control of the element signals and determine the phase settings only from the total output power.

Two algorithms fitting the above description are the random search and the gradient search. A random search algorithm sets the phase shifters by trial and error until the combination that yields the minimum output power is found. This method is analogous to attempting to open a lock without knowing the combination. Unlike a lock that may have 10,000 or 100,000 different combinations, an array with 100 elements and 4 bit phase shifters has a total of $(2^4)^{100}$ different combinations. Checking every possible combination would be ludicrous.

The adaptive algorithm discussed in detail herein is the gradient search algorithm. This algorithm finds the minimum output power by deriving a gradient vector (element weight) that points in the direction of maximum power increase. By moving in the opposite direction, the minimum output power can be found efficiently. The gradient vector is formed for each phase shifter, then the new phase shifter setting is calculated from the gradient.

The components of the gradient vector are found by taking the derivative of the output power with respect to the phase for each element and multiplying by an appropriate step size, $\mu$. An approximation to the derivative is found by the change in phase shift, $\Delta PH$, divided by the corresponding change in output power, $\Delta PWR_i$. $\Delta PH$ remains constant for all elements. After incrementing the phase shifter at element i by the selected step size ($\Delta PH$), the change in output power is measured ($\Delta PWR_i$), the approximate derivative formed ($\Delta PWR_i/\Delta PH$), and the phase shifter returned to its original state. This process of finding the gradient component is repeated for every element. The new adapted phase shifter settings are found by multiplying the approximate derivative by $\mu$, and subtracting the resulting value from the existing phase shifter value. When the process is completed for each phase shifter, the total output power is measured. If the power has increased, $\Delta PH$ is decreased and the process repeated. On the other hand, if the power has decreased, $\Delta PH$ stays the same and the process is repeated. After $\Delta PH$ reaches zero the adaptation is done.

The gradient search algorithm assumes that the phase shifts are relatively small. This assumption prevents the adapted phase settings from significantly distorting the far-field antenna pattern. In particular, the low sidelobe specifications must be kept within an acceptable tolerance. Small phase shifts also prevent cancellation of the main beam signal. Hence, a built-in main beam constraint exists in the algorithm.

Since the main beam signal is kept fairly constant, the sidelobe interference may be reduced by minimizing the total output power of an N element array. Equation (1), below, is the gradient search algorithm.

$$WNEW_i = WOLD_i - \mu(\Delta PWR_i/\Delta PH) \qquad (1)$$

where
$WNEW_i$ = new phase shifter setting for element i
$WOLD_i$ = old phase shifter setting for element i
$\mu$ = gradient step size $\Delta PH^2/TP$ $$TP = \left( \sum_{i=1}^{N} \Delta PWR_i^2 \right)^{\frac{1}{2}}$$

$\Delta PH$ = phase setting step size in least significant bits
$\Delta PWR_i$ = Change in output power due to adding $\Delta PH$ to phase shifter i.

In this equation, $\Delta PWR_i/\Delta PH$ is the component of the gradient vector for element i. After incrementing the phase shifter at element i by a constant step size ($\Delta PH$), the change in output power is measured ($\Delta PWR_i$), the approximation formed ($\Delta PWR_i/\Delta PH$), and the phase shifter returned to its original state. This process of finding the gradient component is repeated for N elements. When adaptation occurs only in the sum channel the gradient is formed from $\Delta PWR_i$ given by:

$$\Delta PWR_i = NEWSUM_i - OLDSUM_i \qquad (2)$$

where
$NEWSUM_i$ = sum channel output power after incrementing phase shifter i by $\Delta PH$
$OLDSUM_i$ = sum channel output power before incrementing phase shifter i by $\Delta PH$ A modification to this equation must be made to incorporate the difference channel. The modified equation takes the form of:

$$\Delta PWR_i = [(NEWSUM_i \times NEWDIF_i) - (OLDSUM_i \times OLDDIF_i)]^{\frac{1}{2}} \qquad (3)$$

where
$NEWDIF_i$ = difference channel output power after incrementing phase shifter i by $\Delta PH$
$OLDDIF_i$ = difference channel output power before incrementing phase shifter i by $\Delta PH$.

Adaptive performance is judged by:

$$NEWPOW < OLDPOW \qquad (4)$$

When equation (4) is not true, $\Delta PH$ is decremented and the adaptive process repeated until $\Delta PH = 0$. On the other hand, if equation (4) is true, $\Delta PH$ stays the same and the adaptive process repeated.

When the adaptive process is performed in the sum channel, then:

$$NEWPOW = S1 \text{ and } OLDPOW = S0 \qquad (5)$$

In the case of nulling in both channels, then $$NEWPOW = S1 + D1 \text{ and } OLDPOW = S0 + D0 \qquad (6)$$

where
S1 = sum output power due to WNEW
D1 = difference output power due to WNEW
S0 = sum output power due to WOLD
D0 = difference power due to WOLD.

The program listed later herein was used in experiments conducted on the present invention and to implement the adaptive algorithm described above.

An 80 element linear phased array was used to verify experimentally the invention. Each element had an 8 bit phase shifter for steering the main beam. These controls were also employed as the adaptive nulling phase shifters in the experiment. Low sidelobe performance in the sum and difference patterns were obtained from Taylor and Bayliss amplitude distributions.

Only one CW source was used as the interferring signal in the experiment. The antenna was rotated until the source was incident at the desired angle. Then, the computer was turned on and the adaptive process started. The output powers in the sum and difference channels were recorded with the phase shifter settings for every iteration.

Since two receivers were not available, the same receiver was shared by the sum and difference channels. A remotely operated mechanical coaxial switch allowed the computer operator to change channels when prompted by the simulation. To reduce the amount of switching, all the values in the array NEWSUM were measured first, the switch flipped, then the values for NEWDIF measured. Next, 80 values for $\Delta PWR_i$ were calculated and used to form the gradient. In a realistic situation, there would be a receiver at each channel. With two receivers, the value for $\Delta PWR_i$ can be computed directly without having to store the power measurements in the arrays NEWSUM and NEWDIF.

The test set-up included a low sidelobe CW transmitting source, the 80 element linear array mounted on an antenna positioner, and a commercially available antenna pattern measurement system. The antenna pattern measurement system controlled the phase shifters and the antenna positioner, as well as received, manipulated, and recorded the data. The single transmitting source in the far-field first served as the jammer then as the source for measuring the far-field patterns.

Figure 2:
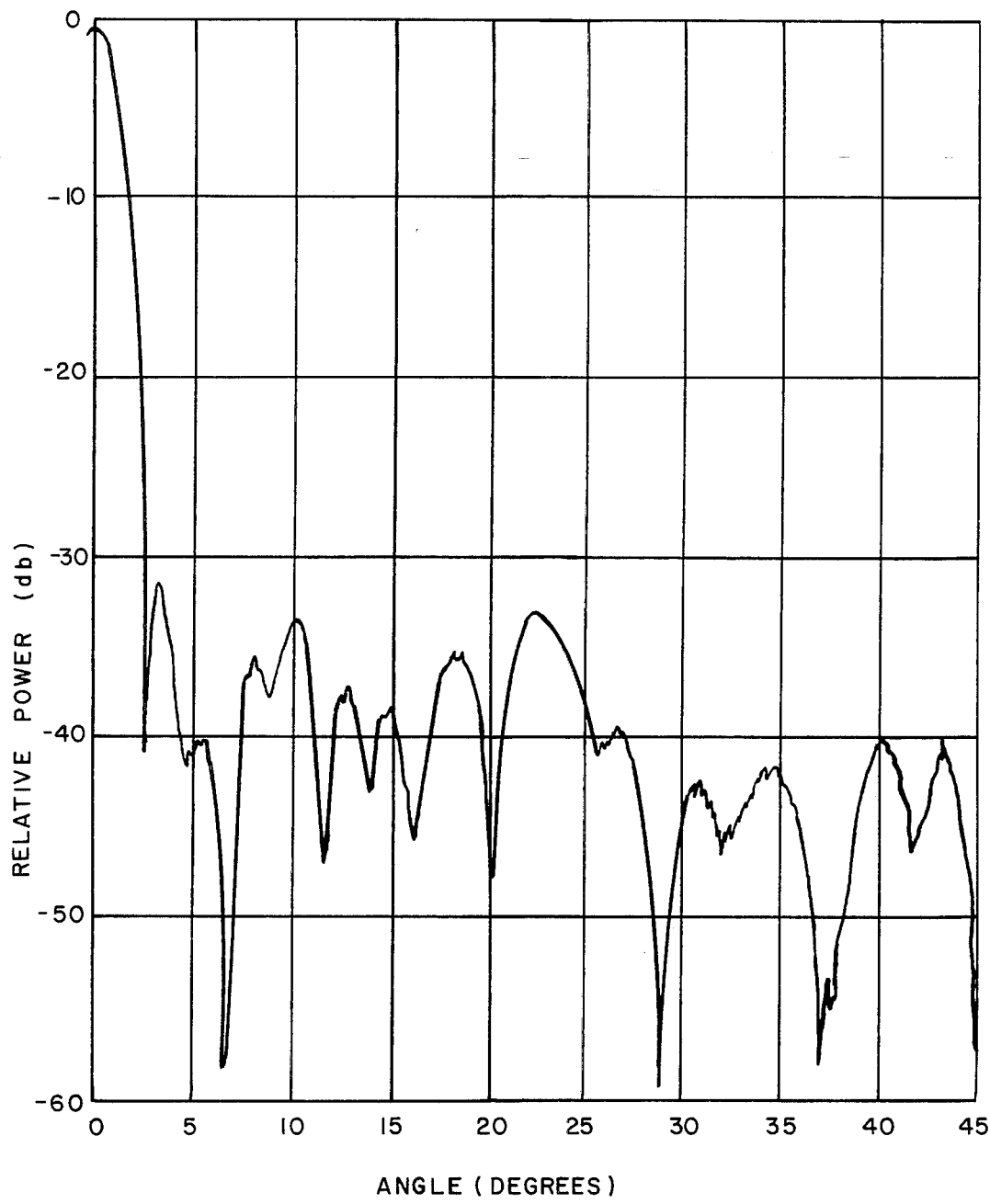
FIG. 2 is a graph illustrating a measured quiescent far-field sum pattern.
Figure 3:
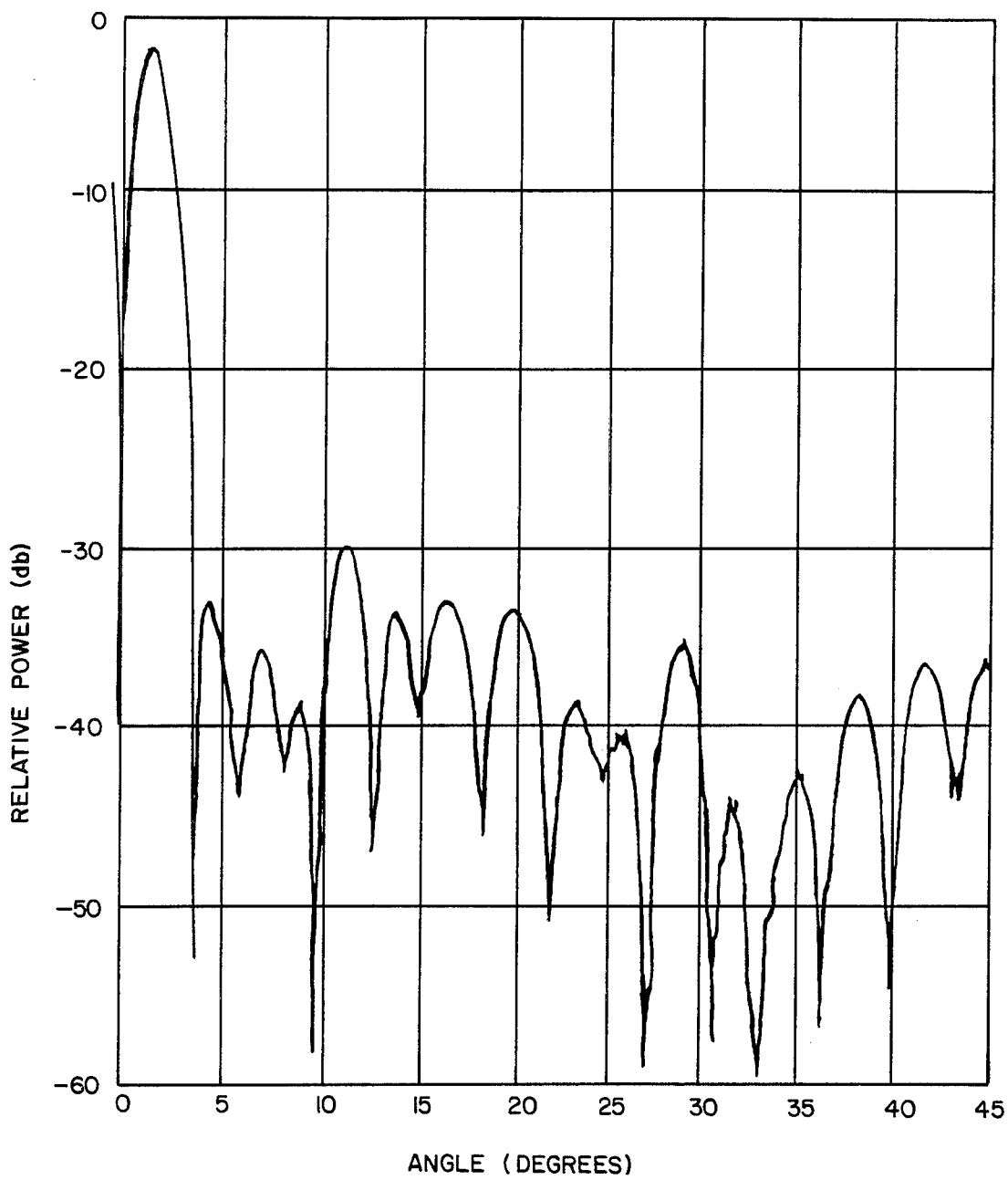
FIG. 3 is a graph illustrating a measured quiescent far-field difference pattern.

Initially, the quiescent far-field patterns were measured and recorded. These patterns appear in FIGS. 2 and 3. The adaptive algorithm was demonstrated by placing the transmit source (jammer) at a desired angle relative to boresite. By looking at the quiescent pattern and monitoring the array output, the antenna was moved on the positioner until the transmit source was incident on the desired sidelobe. Then the adaptive algorithm installed on the computer (listed later herein) adjusted the phase shifters to place a null in the direction of the jammer. Computer output consisted of iteration number, step size, array output power, and phase shifter settings. Once the adaptive routine finished running, the far-field antenna pattern was measured and recorded.

For the adaptive experiments and the far-field antenna pattern measurements, the linear array was positioned with the 80 elements in the elevation plane or vertical to the ground. This position is preferred over the azimuth plane (horizontal to the ground) because scattering from the antenna range is reduced. When the antenna is in the azimuth plane the far-field antenna pattern is at a relatively high level in the direction of the ground. On the other hand when the antenna is in the elevation plane, the low sidelobe region of the pattern is in the direction of the ground, thereby reducing the effect of ground scattering.

Figure 4:
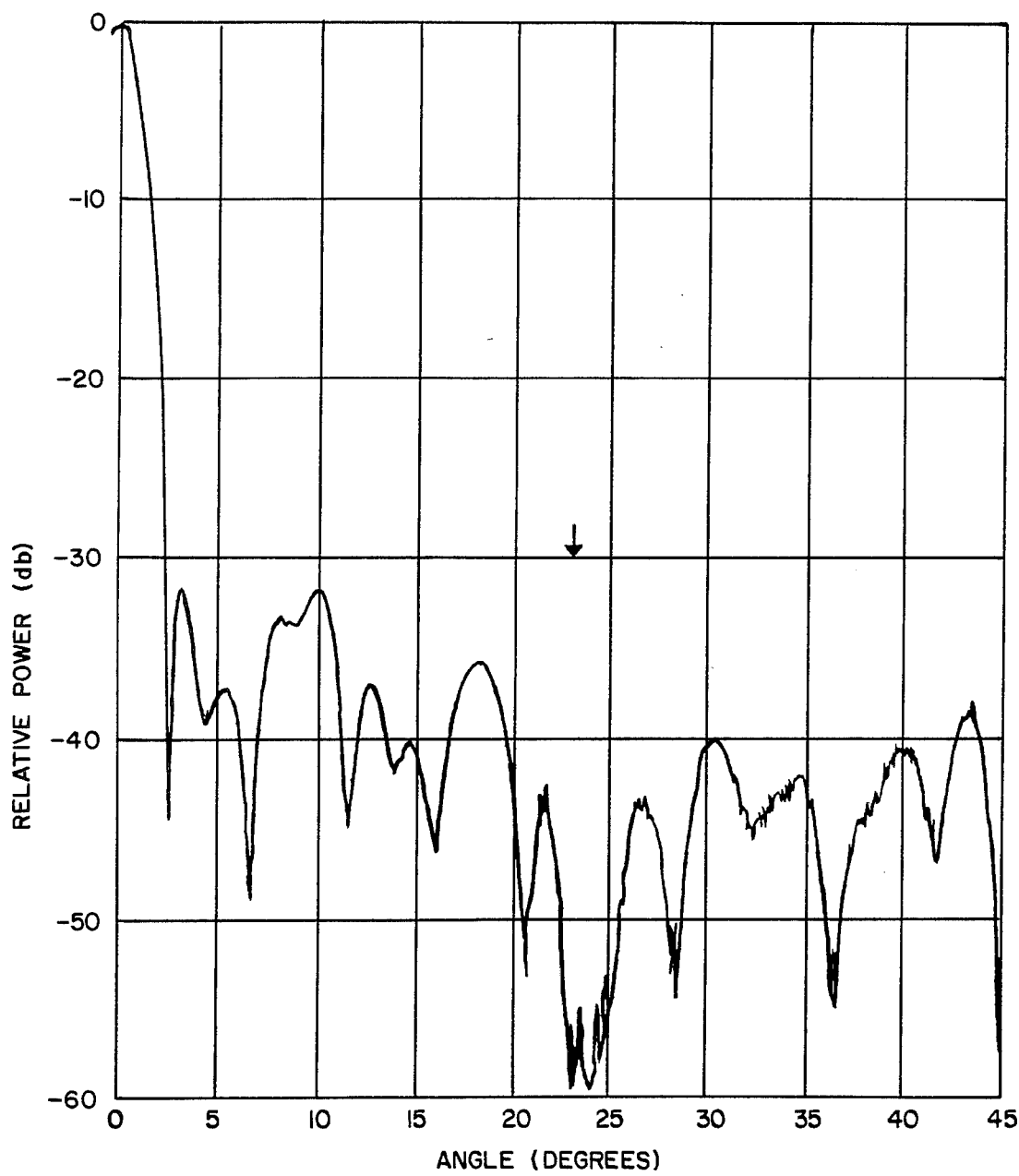
FIG. 4 is a graph illustrating a measured far-field sum pattern with a null at 23 degrees.
Figure 5:
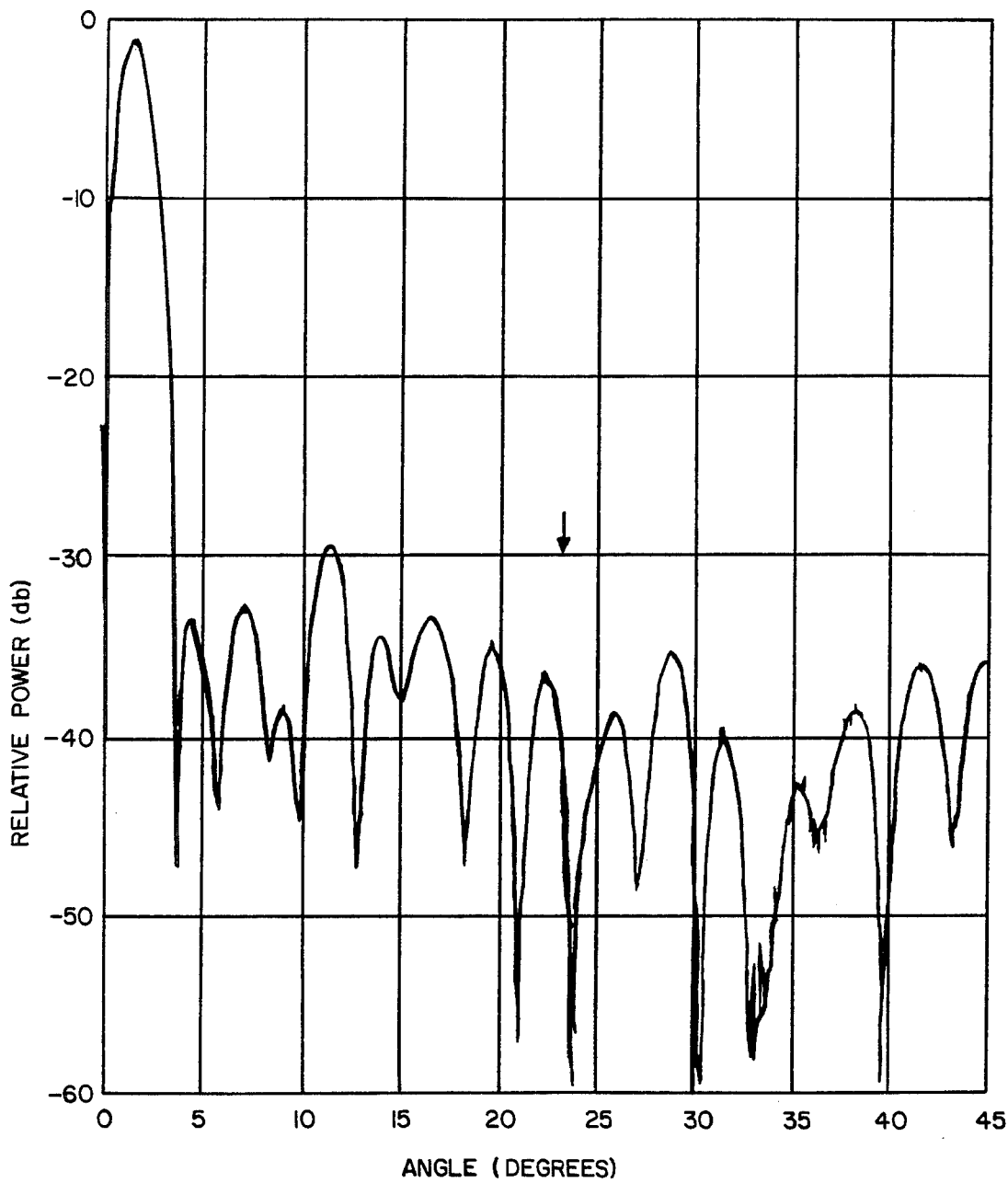
FIG. 5 is a graph illustrating a measured far-field difference pattern resulting from placing a null in the sum pattern at 23 degrees.

FIGS. 4 and 5 demonstrate the need for a special adaptive process that puts nulls in both the sum and difference patterns. The far-field sum pattern (FIG. 4) is the result of changing the phase shifter settings to generate a null in the direction of the jammer at 23°. These phase shifts were produced by the gradient search algorithm. The gradient was formed using equations (1), (2), (4) and (5). Unlike the adaptive sum pattern, the corresponding difference pattern (FIG. 5) had no null at 23°.

Figure 6:
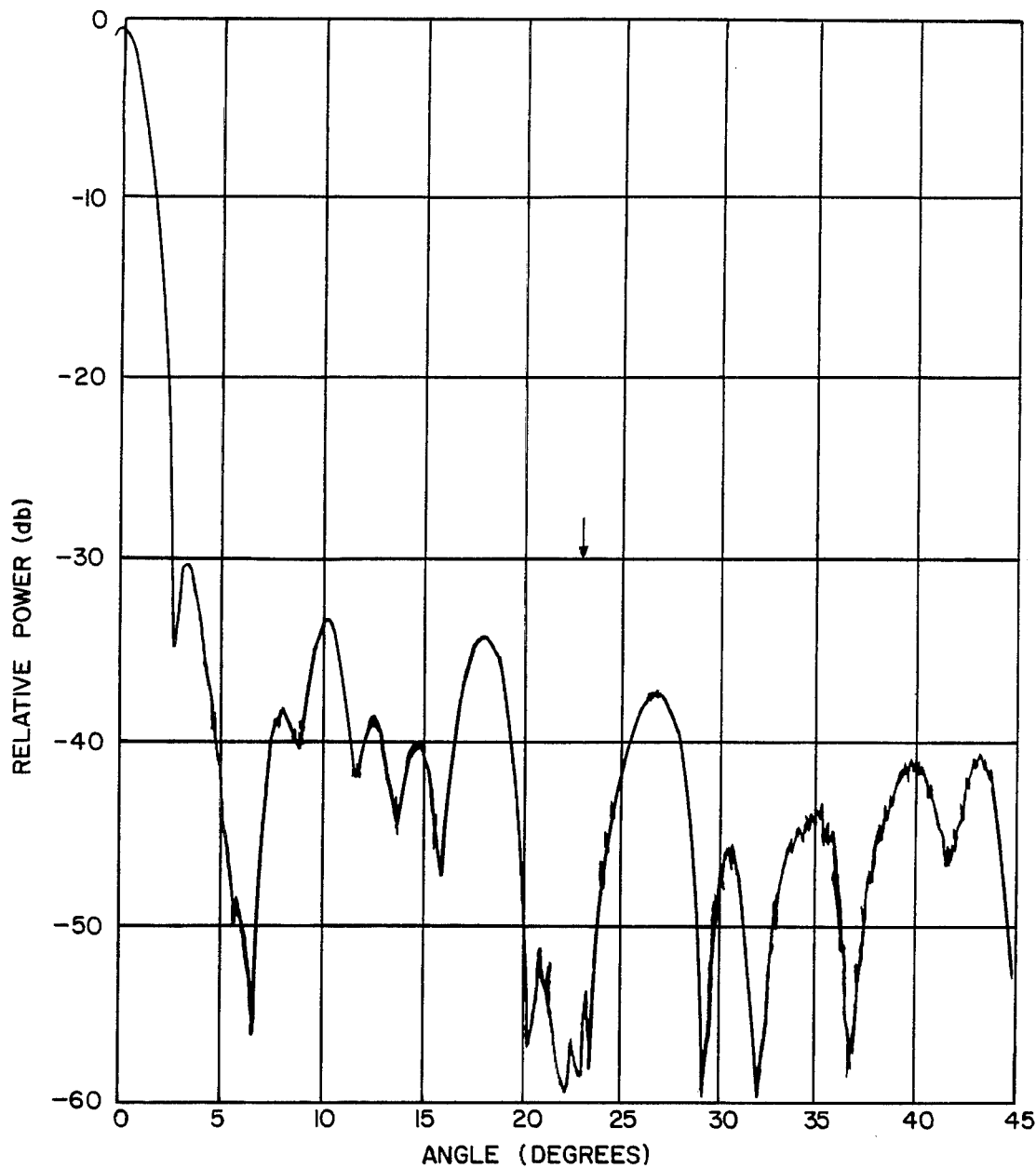
FIGS. 6 and 7 are the measured far-field patterns formed by simultaneously nulling in the sum and difference channels with a jammer at 23°.
Figure 7:
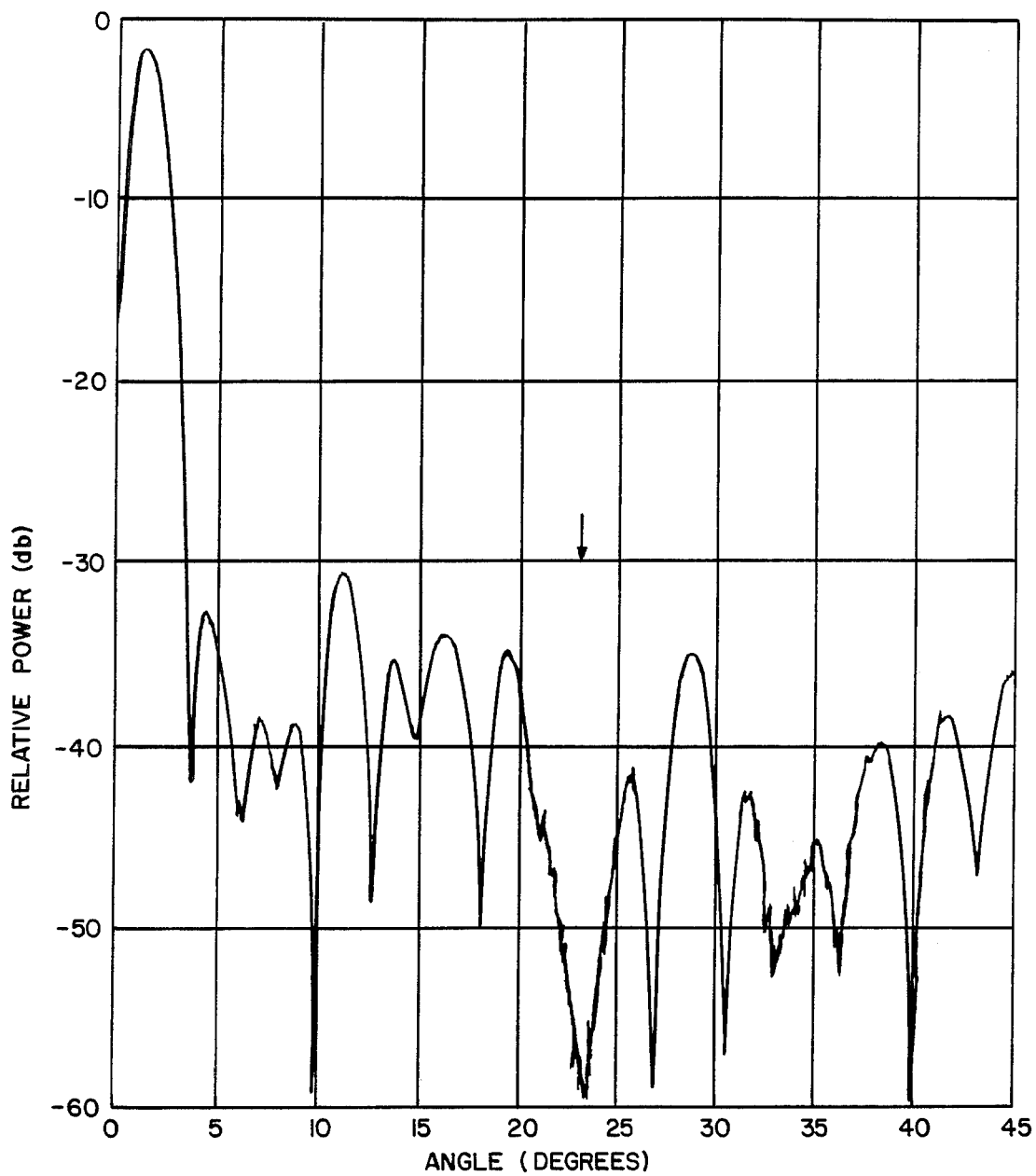

FIGS. 6 and 7 are the far-field patterns that resulted from the simultaneous adaptive process using equations (1), (2), (4) and (6). The jammer direction is indicated by an arrow (23°). Nulls were nicely placed in both patterns in the direction of the jammer.

While a particular embodiment of the present invention has been described in detail, it is to be understood that other modifications are contemplated which would be apparent to persons skilled in the art without departing from the spirit of the invention of the scope of the appended claims.

PROGRAM LISTING

```
0001    FTN4,L
0002          PROGRAM RHAQ(5)
0003          COMMON IVTEK(170)
0004          COMMON IRTN(3),IFLG(1),LU(1),KFNR(1),IONLN(1),KDFPK(3),
0005         1KDFUP(3),KOMT(1),IPFAL(1),JPIA(1),IRCVR(1),KRCD(1),ICMPL(1),
0006         2IDUMA(5),JDISK(1),JBND(6),JBB(6),JBT(6),JITR(6),JTOL(6),
0007         3JAZ(1),JEL(1),JAUT(1),JSRC(1),JAUX(1),JAUX2(1),JSAZ(6),
0008         4JXTAL(5),JDUM(27)
0009          COMMON ITGN(3),IACQ(3),IRID(1),IUID(1),I1ID(1),
0010         1I2ID(1),IAID(1),JEID(1),ITID(1),ISID(1),IUOF(1),IMODE(1),
0011         2IXTAL(1),IOND(1),ILIST(1),IPLOT(1),KRMAX(1),KUMAX(1),
0012         3K1MAX(1),K2MAX(1),KAMAX(1),KEMAX(1),NFRQ(1),
0013         4F(10),NFR(1),IEBM(1),IDBP(1),IDUM(78)
0014          COMMON IEEE(128),MIAM(8),MDFM(120)
0015          DIMENSION KDNAM(3),KTFM(3),KANAM(3)
0016          DIMENSION MPHA(80)
0017          DIMENSION NPHA(80),Z(80),ICC(128),IDAT(3),KKNAM(5),POS(3)
0018          EQUIVALENCE (IA,IDAT(1)),(IMA,IDAT(2)),(ISA,IDAT(3)),(IV,IDAT(4))
0019          EQUIVALENCE (NFRQ,NITR),(IDAT(1),IDUM(30))
0020          EQUIVALENCE (IFA,IDUM(40)),(IFB,IDUM(41))
0021          DATA KKNAM/2HCO,2HMM,2HT ,2HTF,0/
0022          DATA KDNAM/2HDF,2HM ,2H /
0023          DATA KTFM/2HTF,2HM ,2H /
0024          DATA KANAM/2HAL,2HAN,2H /
0025          FZ=F(1)
0026          AANG=F(3)
0027          CALL GPHAS(AANG,FZ,NPHA)
0028          IFA=0
0029          IFB=0
0030    C
0031    C     INITIALIZE FORMATS
0032    C
0033          DO 1 I=1,8
0034    1     MIAM(I)=0
0035          DO 2 I=1,120
0036    2     MDFM(I)=0
0037          DO 3 I=1,55
0038    3     MDFM(I)=1
0039    C
0040    C     TEST FILE
0041    C
0042          MDFM(2)=-128
0043          MDFM(4)=2HTF
0044          MDFM(6)=40000B-15
0045    C
0046    C     COMMENTS
0047    C
0048          MDFM(8)=-128
0049          MDFM(10)=2HCO
0050          MDFM(12)=16
0051          IF(KOMT .EQ. 0)MDFM(8)=0
0052    C
0053    C     BEAM MAX
0054    C
0055          MDFM(14)=-128
0056          MDFM(16)=2HBM
```

```
0057        MDFM(18)=40000B-15
0058   C
0059   C    POSITION MARKER
0060   C
0061        MDFM(22)=2HPM
0062        MDFM(23)=0
0063   C
0064   C    POSITION
0065   C
0066        MDFM(25)=-3
0067        MDFM(27)=2HPO
0068        MDFM(29)=32
0069        IF(IDUM(15).EQ.0)MDFM(25)=0
0070   C
0071   C    FREQUENCY & ANGLES(JAMMER & SIGNAL)
0072   C
0073        MDFM(30)=-3
0074        MDFM(33)=2HFR
0075        MDFM(35)=32
0076   C
0077   C    DATA POINT MARKER
0078   C
0079        MDFM(37)=NITR+2
0080        MDFM(39)=2HDP
0081        MDFM(40)=0
0082   C
0083   C    AMPLITUDE & ITERATION SIZE
0084   C
0085        MDFM(42)=-1
0086        MDFM(44)=2HAA
0087        MDFM(45)=4
0088        MDFM(46)=-14
0089        MDFM(49)=8
0090   C
0091   C    ELEMENTS
0092   C
0093        NANT=IDUM(17)
0094        MDFM(51)=NANT
0095        MDFM(53)=2HEL
0096        MDFM(55)=8
0097   C
0098   C    SET DISK
0099   C
0100        JDTSK=1
0101   C
0102   C    TEMP SET FOR NO BMAX
0103   C
0104        MDFM(14)=0
0105   C
0106   C    PUT KOMT INTO TF
0107   C
0108        IDUM(20)=KOMT
0109   C
0110   C    SET TF FILE
0111   C
0112        ITGN(1)=2HRH
0113        ITGN(2)=2HTG
0114        ITGN(3)=2H
0115        ITGN(4)=2HRH
0116        ITGN(5)=2HAQ
0117        ITGN(6)=2H
0118   C
0119   C    OPEN FILE & TRANSFER FORMATS
0120   C
0121        CALL DFPK(1,1,1,LERR)
0122   C
0123   C    TRANSFER TF
0124   C
0125        CALL DFPK(2,ITGN,128,LERR)
0126   C
0127   C
0128   C    TRANSFER FREQUENCY & ANGLES
0129   C
0130        CALL DFPK(2,F,6,LERR)
0131   C
```

```
0132  C    SET VARIABLES FOR LOWEST ATTENUATION
0133         IFA=0
0134         IFB=0
0135  C    SET INCREMENT SIZE
0136         IV=IDBP
0137  C
0138  C    SET UP & TRANSFER AMP & ELEMENT PHASE DATA
0139  C
0140  C    SET UP RECEIVER
0141  C    CHOOSE REMOTE TUNING
0142         ILR=1
0143  C    ENABLE APC SEARCH
0144         IAPC=1
0145  C    USE WIDE OR NARROW SEARCH DEPENDING ON JXTA(4)
0146  C    DISABLE REFERENCE CHECK
0147         IREF=0
0148  C    CHOOSE MODE
0149         IFF=-1
0150         IF(IMODE .EQ. 101B)IFF=1
0151         IF(IMODE .EQ. 102B)IFF=2
0152         IF(IMODE .EQ. 104B)IFF=3
0153         IF(IMODE .EQ. 123B)IFF=0
0154         CALL RMODE(ILR,IAPC,JXTAL(4),IXTAL,IREF,IFF)
0155  C    SET RECEIVER TO AUTO
0156         CALL RMAN(1)
0157  C    DO MEASUREMENTS
0158  C    SET PHASES
0159         LAST=0
0160  C    INIT SET PHASE ROUTINE
0161         CALL SPHA0(IPHA,ISC,LAST)
0162         DO 40 I=1,NANT
0163         IPHA=NPHA(I)
0164         ISC=I
0165         IF(I .EQ. NANT)LAST=1
0166         CALL SPHA1
0167   40    CONTINUE
0168  C    DO MEASUREMENTS(RESULTS TRANSFERRED IN COMMON)
0169         CALL MEAS
0170  C    ZERO LAST INDICATION & # OF ITERATIONS
0171         LAST=1
0172         ILAST=0
0173         ITT=0
0174  C    TRANSFER DATA
0175   35    CALL DFPK(-2,IDAT,4,LERR)
0176         CALL DFPK(2,NPHA,NANT,LERR)
0177         IF(ILAST .EQ. 1)GO TO 36
0178         ITT=ITT+1
0179         ZZ=0.
0180         WRITE(1,1000)
0181  1000   FORMAT(3X,"SUM THEN 1")
0182         READ(1,*) N
0183         CALL MEAS
0184         SPWDB=IA/10.
0185         SPW=10.**(IA/100.)
0186  C
0187  C    QUIESCENT DIFFERENCE OUTPUT POWER
0188  C
0189         WRITE(I,1001)
0190  1001   FORMAT(3X,"DIFF THEN 1")
0191         READ(1,*) N
0192         CALL MEAS
0193         DPWDB=IA/10.
0194         DPW=10.**(IA/100.)
0195  C
0196  C-----CALCULATES OUTPUT POWER DUE TO CHANGE IN STEP SIZE
0197  C
0198         WRITE(I,1000)
0199         READ(1,*) N
0200         DO 100 I=1,NANT
0201         IPHA=NPHA(I)+IV
0202         IF(IPHA.GE.256) IPHA=IPHA-256
0203         ISC=I
0204         CALL SPHA1
0205         CALL MEAS
0206         Z(I)=10.**(IA/100.)
```

```
0207            IPHA=NPHA(I)
0208            CALL SPHA1
0209  100     CONTINUE
0210  C
0211  C-------DIFFERENCE CHANNEL
0212  C
0213            WRITE(1,1001)
0214            READ(1,*) N
0215            DO 101 I=1,NANT
0216
0217            IPHA=NPHA(I)+IV
0218            IF(IPHA.GE.256) IPHA=IPHA-256
0219            ISC=I
0220            CALL SPHA1
0221
0222            CALL MEAS
0223            Z(I)=Z(I)*10.**(IA/100.)
0224
0225            IPHA=NPHA(I)
0226            CALL SPHA1
0227  101     CONTINUE
0228  C
0229  C-------CALCULATE GRADIENT
0230  C
0231            DO 103 I=1,NANT
0232
0233            Z(I)=Z(I)-SPW*DPW
0234            ZZ=ZZ+Z(I)**2
0235  103     CONTINUE
0236  C
0237            ZZ=ZZ**.5
0238  C
0239  C
0240  C
0241  C-------APPLY GRADIENT
0242  C
0243            DO 104 I=1,NANT
0244
0245            IPHA=NPHA(I)+INT(Z(I)*IV/ZZ+.5)
0246            IF(IPHA.GE.256) IPHA=IPHA-256
0247            IF(IPHA.LT.0) IPHA=IPHA+256
0248            NPHA(I)=IPHA
0249            ISC=I
0250            CALL SPHA1
0251  104     CONTINUE
0252  C
0253  C-------MEASURE THE TOTAL CHANGE
0254  C
0255            WRITE(1,1000)
0256            READ(1,*) N
0257            CALL MEAS
0258            SP=IA/10.
0259  C
0260  C-------GO TO DIFFERENCE CHANNEL
0261  C
0262            WRITE(1,1001)
0263            READ(1,*) N
0264
0265            CALL MEAS
0266            DP=IA/10.
0267  C
0268  C-------CHECK TO SEE IF IMPROVED
0269  C
0270            IF(SP+DP.GE.SPWDB+DPWDB) GO TO 110
0271
0272            SPWDB=SP
0273            DPWDB=DP
0274
0275            IF(ITT. GT. NITR) GO TO 38
0276            GO TO 41
0277  C    TRY A SMALLER INCREMENT
0278  110     IV=IV-1
0279            DO 109 I=1,NANT
0280            ISC=I
```

```
0281              IPHA=NPHA(I)
0282       109    CALL SPHA1
0283   C   IF INCREMENT=0 THEN QUIT
0284              IF(IV .EQ. 0)GO TO 38
0285              GO TO 35
0286       41     DO 42 I=1,NANT
0287              ISC=I
0288              NPHA(I)=MPHA(I)
0289       42     CONTINUE
0290              GO TO 35
0291   C   LAST RECORD HAS ZERO PHASES & POS. DB
0292       38     DO 37 I=1,NANT
0293       37     NPHA(I)=0
0294              IA=10
0295   C   LAST INDICATOR & GO WRITE RECORD
0296              ILAST=1
0297              GO TO 35
0298   C   CLOSE DATA FILE
0299       36     CALL DFPK(8,1,1,LERR)
0300              ICMPL=1
0301              IF(IOND .NE. 0)51,50
0302   C   RETURN TO TFM
0303       50     CALL EXEC(8,KTFM)
0304              CALL MAIN
0305   C   INSTALL DATA FILE NAME FOR DFUP
0306       51     KDFUP(1)=KDFPK(1)
0307              KDFUP(2)=KDFPK(2)
0308              KDFUP(3)=KDFPK(3)
0309              M=0
0310   C   SCHEDULE ANALYSIS PROGRAM
0311       60     ICODE=10000000B+9
0312              CALL EXEC(ICODE,KANAM)
0313              M=1
0314              IF(M .EQ. 1)GO TO 61
0315              GO TO 50
0316       61     WRITE(1,160)
0317       160    FORMAT(1X,"ERROR IN SCHEDULING ANALYSIS PROGRAM",
0318              1/2X,"TRY AGAIN?")
0319              CALL NOYES(ITRY)
0320              IF(ITRY .NE. 0)GO TO 60
0321              GO TO 50
0322              END

** NO ERRORS **   PROGRAM = 01729      COMMON = 00654
```

What is claimed is:

1. A method for phase-only adaptive nulling in a monopulse radar system having a phased array antenna, said phased array antenna comprising a multiplicity of equally spaced antenna elements with phase shifters; a sum channel means and a difference channel means connected to receive radar signals from said antenna and transmit sum and difference signals to radar receiver means, and computer means, said computer means providing phase shifter setting values for steering said antenna, comprising the steps of:

(a) determining the sum channel output power S0 and the difference channel output power D0;

(b) changing the phase of the signal at a phase element i by $\Delta PH$, where $\Delta PH$ is a constant representing the smallest incremental phase change of said phase shifter;

(c) determining the new sum channel output power $NEWSUM_i$ and the new difference channel output power $NEWDIF_i$;

(d) calculating the change in the output power factor $PWR_i$ for each phase element in accordance with a first equation:

$$\Delta PWR_i = [(NEWSUM_i \times NEWDIF_i) - (S0 \times D0)]^{\frac{1}{2}}$$

(e) repeating steps (a) to (d) for phase element i=1;

(f) when i equals N+1, where N equals the number of said phase shifters in said array, calculating the adaptive phase changes for the signals at each said phase element according to a second equation:

$$WNEW_i = WOLD_i - \mu(\Delta PWR_i/\Delta PH)$$

where
$WNEW_i$=new phase shifter setting for element i
$WOLD_i$=old phase shifter setting for element i
$\mu$=gradient step size $\Delta PH^2/TP$ $$TP = \left( \sum_{i=1}^{N} \Delta PWR_i^2 \right)^{\frac{1}{2}}$$

$\Delta PH$=phase setting step size in least significant bits $\Delta PWR_i$=change in output power due to adding $\Delta PH$ to phase shifter i (g) determining the output power S1 from the sum channel and the output power D1 from the difference channel;

(h) substituting the value of S1 for the value of S0 and the value D1 for the value of D0 in said first equation in step (d) if the value of S1+D1 is greater than the value of S0+D0 and repeating steps (a) through (g); and (i) decrementing the value of $\Delta PH$ by one least significant bit;

(j) repeating steps (a) through (g) if the value of $\Delta PH$ is greater than zero; and (k) terminating said method if the value of $\Delta PH$ is equal to zero.

* * * * *

UNITED STATES PATENT AND TRADEMARK OFFICE
CERTIFICATE OF CORRECTION

PATENT NO. : 4,599,622

DATED : July 8, 1986

INVENTOR(S) : Randy L. Haupt

It is certified that error appears in the above-identified patent and that said Letters Patent is hereby corrected as shown below:

In column 1, at line 44, the word "deducted" snould be --deduced--.

In column 2, at line 34, before the word "filed", delete the word "and".

In column 2, at line 34, after the second comma, insert the phrase --and subsequently issued as U.S. Patent Number 4,555,706 on November 26, 1985--.

In column 2, at line 53, the word "pattern" should be --patterns--.

In column 6, at line 12, the word "interferring" should be --interfering--.

UNITED STATES PATENT AND TRADEMARK OFFICE
CERTIFICATE OF CORRECTION

PATENT NO. : 4,599,622

DATED : July 8, 1986

INVENTOR(S) : Randy L. Haupt

Page 2 of 2

It is certified that error appears in the above-identified patent and that said Letters Patent is hereby corrected as shown below:

In column 8, at line 9, delete the word "of" (second occurrence) and substitute therefor the word --and--.

In claim 1, at line 68 of column 15, the expression "i=1" should read --i + 1--.

Signed and Sealed this

Twenty-third Day of December, 1986

Attest:

DONALD J. QUIGG

*Attesting Officer*      *Commissioner of Patents and Trademarks*